Feb. 13, 1968 M. BOTTLING 3,368,750

HEART CAM CLEARING DEVICE

Filed Nov. 29, 1965 2 Sheets-Sheet 1

INVENTOR
Manfred Bottling by Michael J. Striker
Atty

INVENTOR
Manfred Bottling
by Michael J. Striker
Atty

United States Patent Office 3,368,750
Patented Feb. 13, 1968

3,368,750

HEART CAM CLEARING DEVICE

Manfred Bottling, Villingen, Germany, assignor to Kienzle Apparate G.m.b.H., Villingen, Black Forest, Germany Filed Nov. 29, 1965, Ser. No. 510,213
Claims priority, application Germany, Oct. 12, 1965, K 54,657
9 Claims. (Cl. 235—144)

ABSTRACT OF THE DISCLOSURE

The setting arm for the heart cam of a register wheel has a locking part guided by auxiliary cams into a guide way which is located near the periphery of the register wheel so that the locking part locks the register wheel in the cleared position.

The present invention relates to a heart cam clearing device for a register having ordinal register wheels connected by tens-transfer means, and more particularly to a clearing device which prevents angular displacement of the register wheels while disconnected from the tens-transfer means.

Ordinal registers have register wheels connected by tens-transfer means which must be disengaged from the register wheels while the same are cleared and turned to the zero position. After the clearing of the register wheels, the tens-transfer means must again be engaged with the respective register wheels, and therefore it is necessary that the register wheels are held in the exact zero position until the tens-transfer means are operatively connected with the register wheels.

Particularly in registers whose register wheels have large diameters as are used for cash registers, the accurate arresting of the number wheels in the zero position is not easily accomplished since modern calculators operate at very high speed so that the register wheels sometimes move due to inertia beyond the correct zero position, and bounce back, so that the register wheels is not at a standstill in the exact zero position at the moment in which the tens-transfer means are to be coupled with the register wheels so that the tens-transfer means are not properly coupled with the register wheels, resulting in a faulty operation of the register.

In order to hold the register wheels in the zero position, one construction of the prior art provides fork-shaped clearing levers which engage correspondingly shaped abutments of the hub portion of a heart cam used for clearing the register. The tight engagement between the hub portion of the heart cam and the corresponding fork-shaped portion of the clearing lever normally holds the heart cam and thereby the respective register wheel, in the zero position, but at high speed, register wheels of great inertia produce at the hub portion sufficiently great component forces to press the fork-shaped portion of the clearing lever out of the arresting position.

In another prior art construction, the clearing lever has a projection engaging a corresponding recess in the hub portion of the heart cam, but since the radius of the hub portion is small and the rotary speed of the register wheel great, the projection sometimes does not engage the recess, and if the recess is made wider to assure engagement, the heart cam and register wheel are not accurately locked since a certain play in circumferential direction in the region of a small radius, permits an angular displacement of the register wheel which is too great to assure reliable engagement between the tens-transfer means and the register wheels arrested in the cleared zero position.

It is one object of the invention to overcome the disadvantages of known clearing devices for registers having tens-transfer means, and to provide a heart cam clearing device which reliably and accurately locks the register wheels in the cleared zero position.

Another object of the invention is to provide a clearing device for a register which assures reliable engagement of the tens-transfer means with the register wheels in the cleared position of the register.

Another object of the invention is to provide a clearing device for a register with means which reliably lock the register wheels in an accurately determined cleared position.

Another object of the invention is to provide a register operating at high speed, with clearing means which assure a reliable engagement of the register wheels by the tens-transfer means after a clearing operation.

With these objects in view, the present invention relates to an improvement of a heart cam clearing device for an ordinal register. One embodiment of the invention comprises cam means secured to each register wheel and including a heart cam having a hub portion and a pointed tip; locking means secured to each register wheel and having a radial guide way located spaced from the axis of the register a greater radial distance than the hub portion of the heart cam; and clearing means for each register wheel including a setting part cooperating with the heart cam, and a locking part fitting into the guide way.

The clearing means preferably includes a clearing lever whose setting part engages one or the other side of the heart cam to turn the same with the respective register wheel toward the cleared zero position. When the register wheel is in the cleared position, the locking part is located opposite the guide way of the locking means and moves into the same during the last part of the stroke of the clearing lever. When the locking part is located in the guide way into which it accurately fits, turning of the register wheel is impossible.

In the preferred embodiment of the invention, a pair of auxiliary cams is located near the periphery of each register wheel, and are engaged by the locking part of the setting lever when the heart cam and the register wheel are turned by the setting part of the clearing lever almost to the zero position. During the last part of the movement, one or the other of the auxiliary cams turns the register wheel to the zero position under the pressure of the locking part which slides along one or the other of the auxiliary cams. The guide way is formed between the auxiliary cams, so that the locking part falls into the guide way and locks the register wheel when the same is in the cleared zero position.

Preferably, the locking part is a transversely projecting pin carried by the setting part at the free end of the setting lever.

In order to prevent that the transversely projecting locking pin takes up axial space between adjacent register wheels, the auxiliary cams and the guide way between the same have the same axial thickness as the tens-transfer member which is secured to each register wheel, while the axial thickness of the heart cam is greater. Due to the fact that the locking takes place at a portion of the register wheel located near the periphery of the same and at a great radial distance from the axis, only insignificant angular displacement of the register wheel due to the play between the locking pin and the guide way is possible.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figures 1, 2:
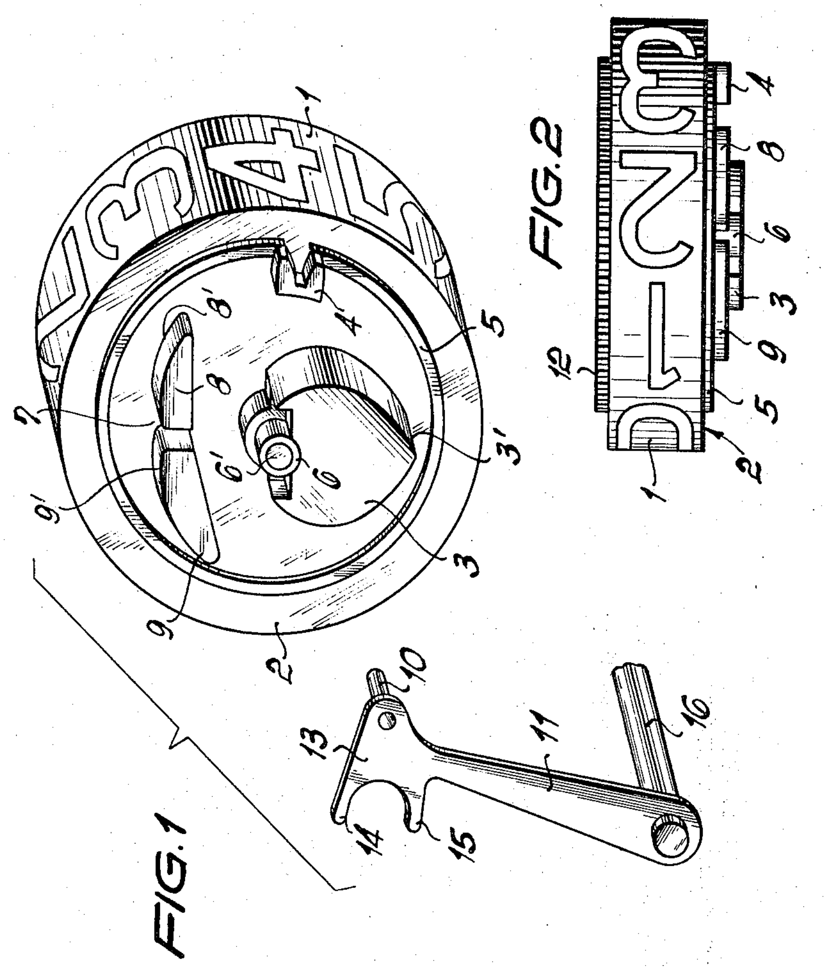
FIG. 1 is an exploded perspective fragmentary view illustrating a register wheel with a heart cam clearing device according to the invention with the clearing lever shown spaced from the register wheel.
FIG. 2 is a plan view of the register wheel with a heart cam.

Referring now to the drawings, a register wheel has a cylindrical portion 1 on which the numbers zero to nine are printed. On one front face 2 a heart cam 3 having a pointed tip 3′ and a hub portion 6 is mounted. A shaft 6′ passes through the hub portions 6 of all register wheels of which only one is illustrated for the sake of simplicity. Abutment faces *6a* and *6b* are provided in the region of the hub portion. In a diametrical position with relation to the pointed tip of the heart cam, a pair of auxiliary cams 8 and 9 is secured to the register wheel. A guide way 7 is formed between the auxiliary cams 8 and 9 and extends in radial direction toward the axis of the register wheel. Outer cam faces 8′ and 9′ are provided on cams 8 and 9. As shown in FIG. 2, a gear 12 is secured to the other side of the register wheel and is adapted to mesh with other gears for turning the register wheel during a totalizing operation. A tens-transfer member 4 with a recess is secured in the usual manner to the register wheel and cooperates with tens-transfer means for causing turning of each register wheel for one unit whenever the register wheel of the next lower order performs one revolution. The tens-transfer device is entirely conventional and therefore not illustrated. However, it will be understood that during the clearing of the register wheels of the register all tens-transfer means are disconnected from the respective tens-transfer members 4 and do not engage the same so that the register wheels can freely turn toward the cleared position indicating zero.

Cam means 8, 9, 3 cooperate with clearing means which include a shaft 16, a clearing lever 11 secured to shaft 16, and a setting portion 13 which is fork-shaped and has two prongs 14 and 15 forming therebetween a recess. A locking pin 10 projects in axial direction from setting portion 13.

The clearing means 10 to 16 is mounted in such a position that its setting portion is in the plane of the abutment faces *6a* and *6b*, while locking pin 10 projects into the region of the auxiliary cams 8 and 9. Cams 8 and 9 have an axial thickness corresponding to the axial thickness of tens-transfer member 4 as best seen in FIG. 2 while the heart cam 3 is thicker and particularly the portion of the same formed with abutment faces *6a* and *6b* projects beyond the auxiliary cams 8 and 9 in axial direction. Therefore, if the setting portion 13 is in the position shown in FIG. 5 with prongs 14 and 15 abutting abutment faces *6a* and *6b*, locking pin 10 projects into the region of the guide way 7.

Figures 3, 4:
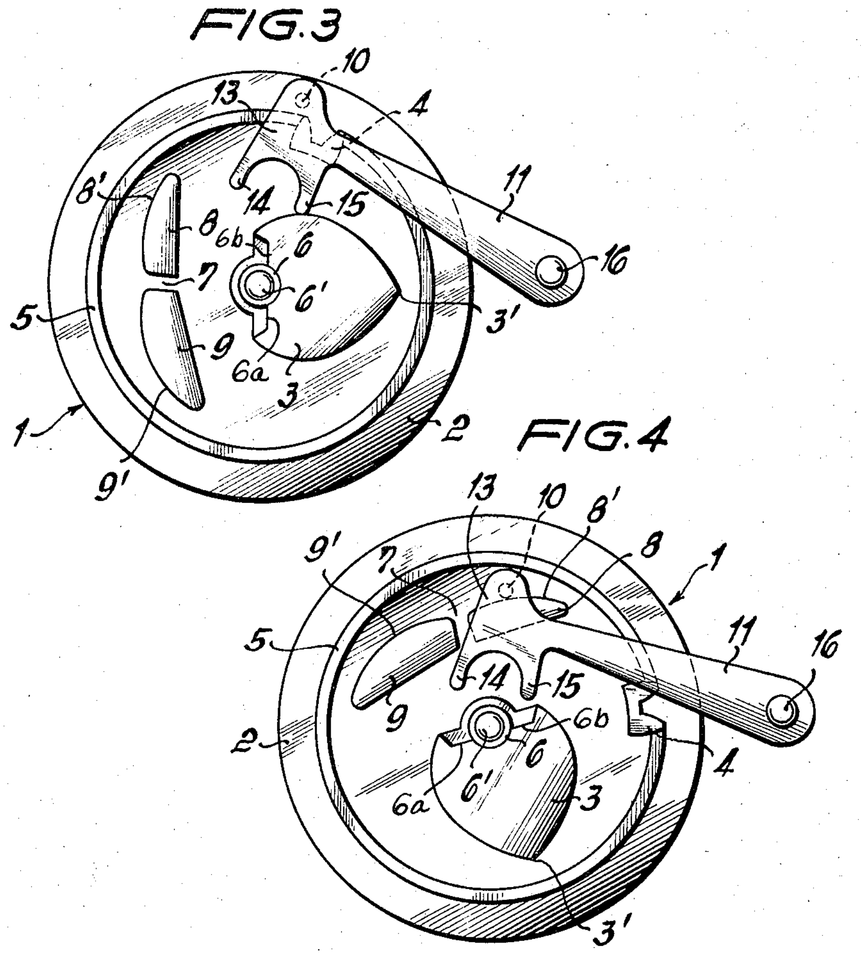
FIG. 3 is a fragmentary front view illustrating the start of a clearing operation.
FIG. 4 is a front view illustrating a register wheel and the clearing device shortly before arriving in the cleared position.

At the start of a clearing operation, the clearing means 10 to 15 is located spaced from the heart cam. Shaft 16 is positioned so that the setting portion 13 moves toward the axis of shaft 6′ when lever 11 is turned in counterclockwise direction as viewed in FIG. 3. Depending on the digital position of the register wheel, prong 15 will engage one side of the heart cam, or prong 14 will engage the other side of the heart cam. In the position of FIG. 3, prong 15 is operative to engage the corresponding curved cam face of heart cam 3, and to turn the same with the register wheel toward the zero position.

Figure 5:
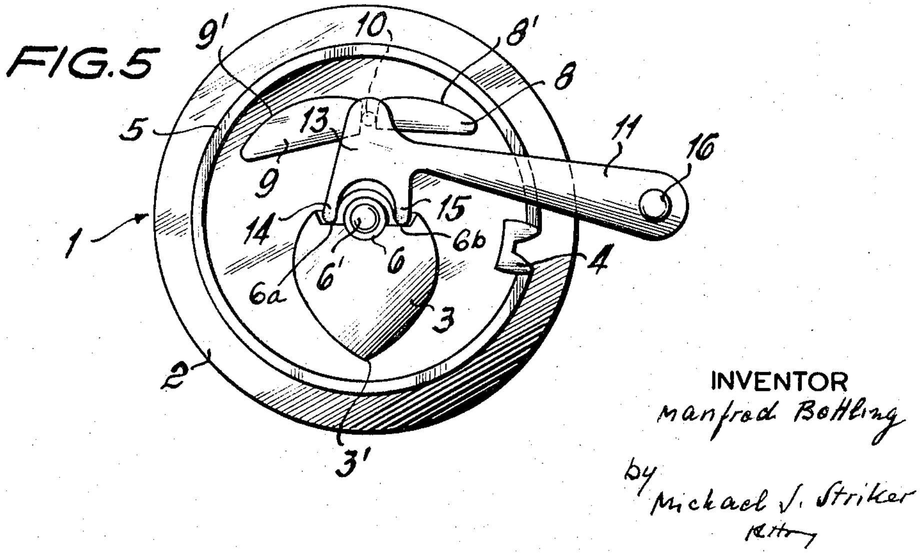
FIG. 5 is a front view illustrating a register wheel and the clearing device in the cleared zero position of the register wheel.

Before the zero position is reached, locking pin 10 is engaged by the cam face 8′ of auxiliary cam 8 as shown in FIG. 4, so that prong 15 of setting portion 13 is gradually lifted off the cam face of heart cam 3, while locking pin 10 exerts pressure on auxiliary cam 8 producing a circumferential force component which turns register wheel further in clockwise direction so that the same moves to the position shown in FIG. 5 in which locking pin 10 is aligned with guide way 7. Since guide way 7 is located on a straight line connecting the axis of the register wheel with a pointed tip 3′ of heart cam 3, further movement of clearing means 10 to 15 causes movement of locking pin 10 into the radially extending guide way 7. The diameter of the locking pin or corresponding locking part is so selected that it exactly fits into the guide way with only so much play as necessary to assure the falling of locking pin 10 into the guide way even if the register wheel with cam means 8, 9, 3 is very rapidly turned by clearing means 10 to 15 toward the cleared zero position. Since guide way 7 is spaced a great radial distance from the axis of the register wheel, no angular displacement of the register wheel is possible when locking pin 10 is located in guide way 7. Since the minimal play required for slipping of locking part 10 into the guide way, permits at such radial distance only a completely insignificant angular displacement of the register wheel the position of the tens-transfer member 4 in relation to the tens-transfer means, not shown, is exactly determined.

It will be understood by those skilled in the art, that the tens-transfer means, not shown, are prevented by other means from turning relative to the register wheel while the same is cleared and locked.

As shown in FIG. 5 prongs 14 and 15 rest on abutment faces *6a* and *6b* in the cleared zero position of the device. The hub portion of the heart cam is located in the recess between prongs 14 and 15 and the depth and shape of the recess are selected so that the outer surface of the hub portion is spaced from the surface of the recess. Consequently, no turning movement is exerted on prongs 14 or 15 in a position intermediate the positions shown in FIGS. 4 and 5 when prongs 15 begins to engage abutment face *6b* before the locking pin 10 has entered guide way 7. The position of clearing means 10 to 15 must be selected so that locking pin 10 does not interfere with tens-transfer member 4 in any position of the register wheel, which can be accomplished without difficulty.

After the tens-transfer means have reengaged tens-transfer member 4, all levers 11 are turned by shaft 16 in clockwise direction, as viewed in FIG. 5 to an inoperative position in which prongs 14 and 15 are spaced from the respective heart cam 3 of the register wheels.

In the illustrated embodiment, the auxiliary cams 8 and 9 are shown spaced from heart cam 3. However, since setting part 13, 14, 15 is thin and located axially outward of auxiliary cams 8 and 9, it is possible to connect the auxiliary cams 8 and 9 with the hub portion of heart cam 3, but the thickness of the auxiliary cams and the connecting wall must not exceed the thickness of tens-transfer member 4. In such a modified construction, guide way 7 would be closed at the inner end thereof. Of course, the connection between auxiliary cams 8 and 9 and the heart cam must be shaped so as to not interfere with the tens-transfer means, not shown.

It will be understood that each of the elements described above, or two or more together, may also find a useful application in other types of clearing devices for registers differing from the types described above.

While the invention has been illustrated and described as embodied in a device for locking a register wheel in a cleared position, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In combination with a register having ordinal register wheels rotatable about an axis; a heart cam clearing device comprising cam means secured to each register wheel for rotation therewith and including a heart cam having a hub portion and a pointed tip; and clearing means for each register wheel movable in a clearing stroke toward said axis and including a setting part cooperating with said heart cam to turn the same with the respective register wheel toward a cleared position, one of said means including a radial guide way located on the side of said axis remote from said pointed tip and extending along a line passing through said axis and said tip, and the other means including a locking part fitting into said guide way and being aligned with the same in said cleared position, said guide way and locking part being spaced from said axis a greater distance than said hub portion, said locking part being located in said guide way at the end of said clearing stroke to lock said register wheel in said cleared position against rotary movement, said cam means including a pair of auxiliary cams located on opposite sides of said guide way and engaged by said clearing means when said register wheel approaches said cleared position so that said register wheel is turned by said auxiliary cams to said cleared position while said setting part is held spaced from said heart cam.

2. A clearing device according to claim 1 wherein said locking part of said clearing means engages one or the other of said auxiliary cams for turning said register wheel to said cleared position before entering said guide way.

3. In combination with a register having ordinal register wheels rotatable about an axis, a heart cam clearing device comprising a heart cam secured to each register wheel and having a low portion and a pointed tip diametrically disposed; clearing means for each register wheel movable in a clearing stroke toward said axis and including a setting part cooperating with said heart cam to turn the same with the respective register wheel toward a cleared position; and locking means including a first locking part and a second locking part fitting into said first locking part, one of said locking parts being secured to said register wheel outwardly and radially spaced from said low portion, and the other locking part being secured to said setting means, said other locking part engaging said first locking part at the end of said clearing stroke and being located in said cleared position radially spaced and outwardly of said low portion of said heart cam so as to lock said register wheel in said cleared position against rotary movement.

4. A heart cam clearing device as claimed in claim 3 wherein said second locking part is secured to said setting means and said first locking part is secured to said register wheel and has a guide way and cam faces continuing said guide way for guiding said second locking part during said setting stroke into said guide way.

5. A clearing device according to claim 4 wherein said guide way has parallel walls, and wherein said second locking part is a pin projecting in axial direction from said setting part of said clearing means and having a diameter matching the distance between said parallel walls without play.

6. A clearing device according to claim 5, wherein said guide way is located adjacent the periphery of said register wheel.

7. A clearing device according to claim 1, including a tens-transfer member secured to each register wheel and having a predetermined axial thickness less than the axial thickness of said heart cam, and wherein said auxiliary cams have substantially the same axial thickness as said tens-transfer member.

8. A clearing device according to claim 3 wherein said setting part has a fork-shaped end portion having two prongs alternatively engaging opposite sides of said heart cam during said clearing stroke; wherein said low portion of said heart cam has abutment means engaged by said prongs in said cleared position of said heart cam and said register wheel, wherein said fork-shaped end portion has a recess between said prongs, wherein said low portion is located in said recess in said clearing position, the surface of said low portion being spaced from the surface of said recess, and wherein said fork-shaped end portion has a projecting portion diametrically opposite said recess and supporting said second locking part.

9. A clearing device according to claim 1 wherein said locking part of said clearing means engages one or the other of said auxiliary cams for turning said register wheel to said cleared position before entering said guide way; and wherein said locking part is a pin projecting in axial direction from said setting part of said clearing means and having a diameter matching the width of said guide way without play.

References Cited

UNITED STATES PATENTS

| | | | |
|---|---|---|---|
| 2,034,825 | 3/1936 | Newell | 235—144 X |
| 2,980,329 | 4/1961 | Hoffmann | 235—139 |
| 3,248,051 | 4/1966 | Kelch | 235—144 |

FOREIGN PATENTS

| | | |
|---|---|---|
| 894,517 | 4/1962 | Great Britain. |

STEPHEN J. TOMSKY, *Primary Examiner.*